(12) United States Patent
McFarland

(10) Patent No.: US 11,271,929 B1
(45) Date of Patent: Mar. 8, 2022

(54) DYNAMIC DISPLAY CONTROL APPLICATION FOR CONTROLLING GRAPHICAL USER INTERFACE ELEMENTS BASED ON ACTIVITY DATA

(71) Applicant: BIZZ dot BUZZ, LLC, Beaumont, TX (US)

(72) Inventor: Shane Taylor McFarland, Beaumont, TX (US)

(73) Assignee: BIZZ dot BUZZ, LLC, Beaurmont, TX (US)

( * ) Notice: Subject to any disclaimer, the term of this patent is extended or adjusted under 35 U.S.C. 154(b) by 0 days.

(21) Appl. No.: 17/487,827

(22) Filed: Sep. 28, 2021

Related U.S. Application Data

(60) Provisional application No. 63/084,561, filed on Sep. 28, 2020.

(51) Int. Cl.
| | |
|---|---|
| *H04L 29/06* | (2006.01) |
| *G06F 21/62* | (2013.01) |
| *G06F 9/451* | (2018.01) |
| *G06F 3/0482* | (2013.01) |

(52) U.S. Cl.
CPC ........ *H04L 63/0853* (2013.01); *G06F 3/0482* (2013.01); *G06F 9/451* (2018.02); *G06F 21/629* (2013.01)

(58) Field of Classification Search
CPC ... H04L 63/0853; G06F 3/0482; G06F 9/451; G06F 21/629
See application file for complete search history.

(56) References Cited

U.S. PATENT DOCUMENTS

| | | | | |
|---|---|---|---|---|
| 9,678,651 | B2* | 6/2017 | Moha | G06F 3/04883 |
| 10,303,526 | B2* | 5/2019 | Uhm | G06F 3/1454 |
| 10,921,952 | B2* | 2/2021 | Hong | G06F 3/0482 |
| 2007/0094608 | A1* | 4/2007 | Getsch | G06F 9/451 |
| | | | | 715/762 |
| 2009/0177990 | A1* | 7/2009 | Chen | G06F 3/04847 |
| | | | | 715/769 |
| 2012/0110489 | A1* | 5/2012 | Huttelmaier | G06F 3/0481 |
| | | | | 715/771 |
| 2016/0098189 | A1* | 4/2016 | Goertz | G06F 3/04886 |
| | | | | 715/703 |
| 2017/0199749 | A1* | 7/2017 | Wolfson | G06F 3/0481 |
| 2019/0025992 | A1* | 1/2019 | Ihrig | G06F 3/0482 |
| 2020/0057541 | A1* | 2/2020 | Wantland | G06F 3/0484 |

* cited by examiner

*Primary Examiner* — Beemnet W Dada
(74) *Attorney, Agent, or Firm* — Shah IP Law, PLLC

(57) ABSTRACT

The systems and methods disclosed herein are for a control application for reformatting the graphical user interface being displayed on a computing device. In one embodiment, the control application interfaces with the operating system of the device and disables certain functionality. The disabled functionality may be restored based on user activity data. In which case, the control application re-enables functionality of certain applications by displaying additional graphical user interface elements.

20 Claims, 11 Drawing Sheets

DYNAMIC DISPLAY CONTROL APPLICATION FOR CONTROLLING GRAPHICAL USER INTERFACE ELEMENTS BASED ON ACTIVITY DATA

CROSS-REFERENCE TO RELATED APPLICATIONS

This application claims priority to and benefit of U.S. Provisional Patent Application No. 63/084,561, titled "SYSTEMS AND METHODS FOR TASK-BASED ENABLING OF FUNCTIONALITY," filed on Sep. 28, 2020. That application is incorporated by reference in its entirety herein.

BACKGROUND

Field of Art

This disclosure relates generally to graphical user interface control systems for automatically disabling functionality associated with a device based on activity data.

Background

In modern computing devices, graphical user interfaces tend to be static. Generally, there is limited ability to control the graphical user interfaces. While this is generally fine in some contexts, there are numerous challenges presented to parents and employers whose children and employees, respectively, who use graphical user interfaces on computing devices. For the parent, there is great concern about what apps will be run by a child that can impact their mental and physical health as well as situations when the device can be used. For the employer, there is great concern about use of employer provided devices to run non-work-related apps that can impact employee safety and efficiency. Unfortunately, the number of readily-available apps increases daily such that parent or employer monitoring of multiple devices becomes a full-time job that is nearly impossible to perform effectively. In addition, given the somewhat addicting nature of certain applications that may be available, it is increasingly difficult for parents to incentivise positive activity and appropriately limit activity that, if consumed in large doses, may be harmful. That functionality is simply unavailable in most smart phones and computing devices.

SUMMARY

Accordingly, it is an object of the present invention to provide methods and systems for managing the graphical user interfaces of mobile computing devices. More specifically, systems and methods are disclosed herein for executing a control application on a mobile computer that causes the mobile computer to only display applications that are approved for use based on activity data. Systems and methods are provided herein for executing a dynamic display control application on a client device, wherein the dynamic display control application comprises first executable instructions, second executable instructions, and third executable instructions. The control application executes the first executable instructions by disabling applications in a first list that are executable by the first computing device. The control application also displays a first graphical user interface (GUI) element illustrating that applications in a first list are disabled. Thereafter, the control application executes the second executable instructions by displaying a second GUI element that comprises a first section displaying queries, second section displaying a plurality of responses, and a third section for receiving user input. Any user input that is provided is received by the control application that automatically determines whether the user has provided a threshold number of suitable responses via the user input within a threshold amount of time. In one embodiment, the control application makes this determination by communicating with a server system. The control system may also automatically compute an access token grant, which is based on the number of suitable responses that are received within a threshold period of time. In one embodiment, a threshold number of access tokens enable access to at least one application in the first list. The control application also executes the third executable instructions by displaying a third GUI element which displays applications in the first list that are no longer disabled based on the number of access tokens that are available to the user.

BRIEF DESCRIPTION OF THE DRAWING FIGURES

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

DETAILED DESCRIPTION OF EMBODIMENTS

Figure 1:
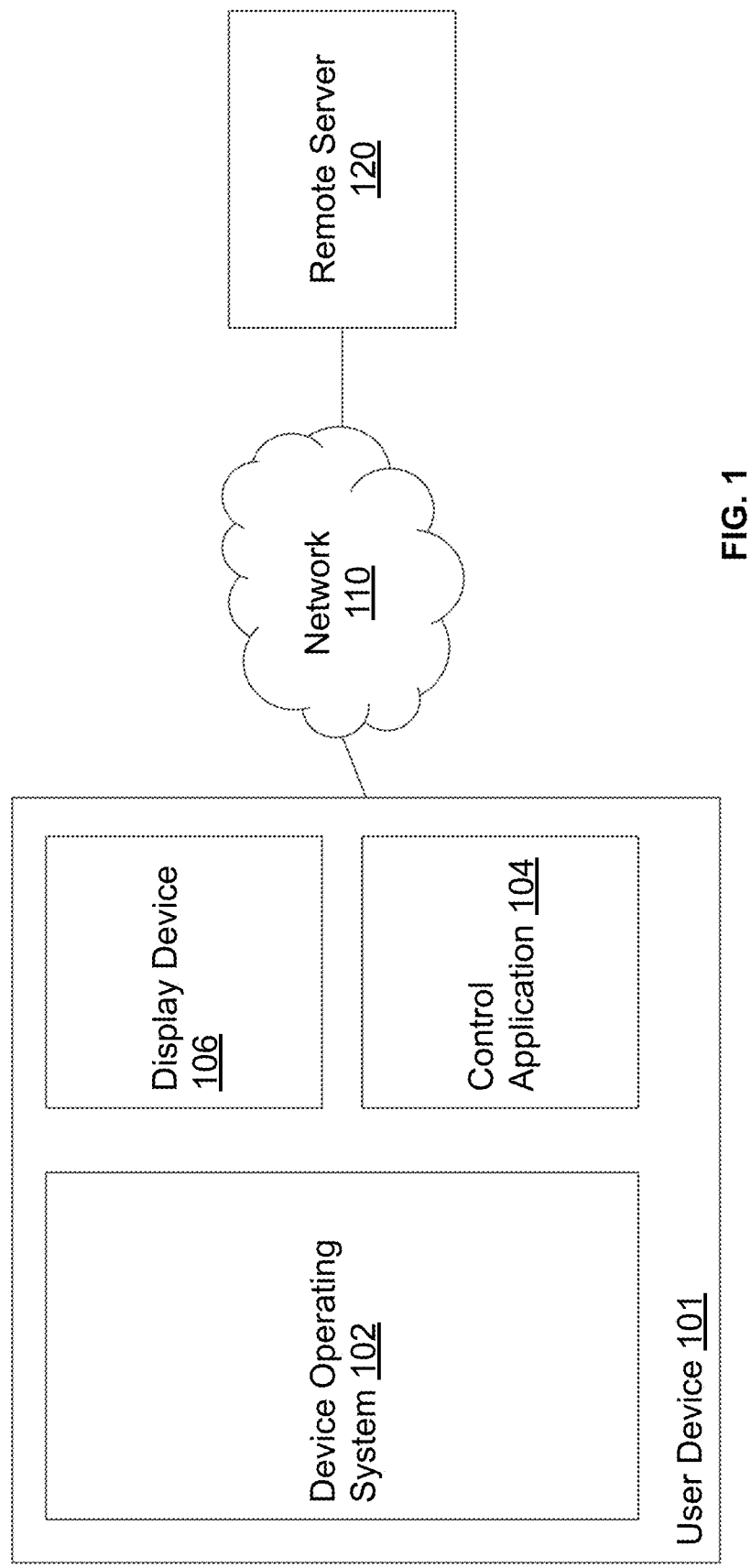
FIG. 1 illustrates a system for a GUI control application in accordance with an exemplary embodiment of the invention.

The inventive systems and methods (hereinafter sometimes referred to more simply as "system" or "method") described herein significantly reduce computation resources used to distract a student from online learning. A student may use a device to access one or more quizzes (e.g., tests, etc.) on one or more particular subjects. The device may comprise or be associated with additional functionality, such as applications or control of additional devices. The additional functionality may be disabled. The student may use the device to initiate one of the one or more quizzes. The student may provide answers to the initiated quiz. The student may receive an amount of digital currency (e.g., virtual currency, virtual points, cryptocurrency, digital tokens, etc.) based on the provided answers. The received amount of digital currency may be added to a total digital currency. The student may use to the received digital currency to enable some or all of the disabled additional functionality of the device.

One or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, software, electrical and other changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible embodiments and in order to more fully illustrate one or more embodiments. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, method, or algorithm is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various embodiments in which, for example, functions may be executed out of order from that shown or discussed, including substantially concurrently or in reverse order, depending on the functionality involved, as would be understood by those having ordinary skill in the art.

FIG. 1 illustrates a system for controlling the display of a computing device by controlling the graphical user interface elements that can be displayed on the display device. The system may comprise a user device 101, a control application 104, a display device 106, a network 110, and a remote server 112. The various computing devices described herein are exemplary and for illustration purposes only. The system may be reorganized or consolidated, as understood by a person of ordinary skill in the art, to perform the same tasks on one or more other servers or computing devices without departing from the scope of the invention.

The device operating system 102, the control application 104, and the display device 106 may be embodied or stored on a user device 101. The user device may be located at a singular location, such as a residence, a school, a commercial site, etc. In one embodiment, the control application 104 may communicate with the device operating system 102 based on protocols that are enabled by the operating system 102 and/or the device. In one embodiment, the user device 101 may use a short range communication protocol to communicate with devices at the premises, such as the control application 104 and/or the display device 106. The user device 101 may use a long range communication protocol to communicate with the remote server 120 via the network 110.

The user device 101 (herein referred to as user input device, user device, or client device) may include, generally, a computer or computing device including functionality for communicating (e.g., remotely) over the network 110. Data, such as lessons, quizzes, tests, answers, etc., may be collected from one or more remote servers, such as the remote server 120 via the network 110. Data requests, such as a request to access a website hosted by a remote server, such as the remote server 120, may be initiated by the user device 101. Client device(s) 101 may be a server, a desktop computer, a laptop computer, personal digital assistant (PDA), an in- or out-of-car navigation system, a smart phone or other cellular or mobile phone, or mobile gaming device, among other suitable computing devices. Client devices 101 may execute one or more client applications, such as a web browser (e.g., Microsoft Windows Internet Explorer, Mozilla Firefox, Apple Safari, Google Chrome, and Opera, etc.), or a dedicated application to submit user data, or to make prediction queries over the network 110.

In particular embodiments, each user device 101 may be an electronic device including hardware, software, or embedded logic components or a combination of two or more such components and capable of carrying out the appropriate functions implemented or supported by the user device 101. For example and without limitation, user device 101 may be a desktop computer system, a notebook computer system, a netbook computer system, a handheld electronic device, or a mobile telephone. The present disclosure contemplates any user device as the user device 101. The user device 101 may enable a network user at the user device 101 to access network 110. The user device 101 may enable its user to communicate with other users at other client devices.

The user device 101 may have a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. The user device 101 may enable a user to enter a Uniform Resource Locator (URL) or other address directing the web browser to a server, and the web browser may generate a Hyper Text Transfer Protocol (HTTP) request and communicate the HTTP request to server. The server may accept the HTTP request and communicate to the user device 101 one or more Hyper Text Markup Language (HTML) files responsive to the HTTP request. The user device 101 may render a web page based on the HTML files from server for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

The user device 101 may also include an application that is loaded onto the user device 101. The application obtains data from the network 110 and displays it to the user within the application interface.

This disclosure contemplates any suitable number of client devices 101, including computing systems taking any suitable physical form. As example and not by way of limitation, computing systems may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computing system may include one or more computer systems; be unitary or distributed; span multiple locations; span multiple machines; or reside in a cloud, which may include one or more cloud components in one or more networks. Where appropriate, one or more computing systems may perform without substantial spatial or temporal limitation one or more steps of one or more methods described or illustrated herein. As an example, and not by way of limitation, one or more computing systems may perform in real time or in batch mode one or more steps of one or more methods described or illustrated herein. One or more computing system may perform at different times or at different locations one or more steps of one or more methods described or illustrated herein, where appropriate.

In one embodiment, the control application 104 interfaces with the device operating system 102 to control the display of graphical user interface elements on the device display 106. For example, the control application 104 generates codes that are acceptable by the device operating system 102. The codes enable the control application 104 to override the default operation of the operating system 106. In this manner, the control application 104 controls the user device 101. The control application reformats the display aspects of the user device 101, and prevents a user from accessing certain applications. In one embodiment, the control application 104 disables certain applications that are listed in a first list. In another embodiment, the control application 104 disables applications that are not in a first list. The disabled applications may not be used or accessed by the user of the computing device 101 until an access token is generated by the control application 104. The access token enabling the control application 104 to enable certain applications based on the associated permissions, which are described in greater detail below.

In one embodiment, the control application 104 may be located outside or away from the user device 101. In that embodiment, the control application 104 may use one or more short range communication protocols to communicate with devices at the premises, such as the user device 101 and/or the display device 106. The control application 104 may act as an intermediary between the user device 101 and the display device 106. The control application 104 may receive commands from the user device 101 and control the display device 106 based on the commands. The control application 104 may cause commands from the user device 101 intended for the display device 106 to be ineffective under certain circumstances. The control application 104 may comprise a set-top box, a cable box, a gateway, an access point, an internet-of-things device, the like, or any combination of the foregoing. The display device 106 may comprise a television, monitor, etc.

The network 110 generally represents a network or collection of networks (such as the Internet or a corporate intranet, or a combination of both) over which the various components illustrated in FIG. 1 (including other components that may be necessary to execute the system described herein, as would be readily understood to a person of ordinary skill in the art). In particular embodiments, network 110 is an intranet, an extranet, a virtual private network (VPN), a local area network (LAN), a wireless LAN (WLAN), a wide area network (WAN), a metropolitan area network (MAN), a portion of the Internet, or another network 110 or a combination of two or more such networks 110. One or more links connect the systems and databases described herein to the network 110. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable network 110, and any suitable link for connecting the various systems and databases described herein.

The network 110 connects the various systems and computing devices described or referenced herein. In particular embodiments, network 110 is an intranet, an extranet, a virtual private network (VPN), a local area network (LAN), a wireless LAN (WLAN), a wide area network (WAN), a metropolitan area network (MAN), a portion of the Internet, or another network or a combination of two or more such networks 110. The present disclosure contemplates any suitable network 110.

One or more links couple one or more systems, engines or devices to the network 110. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable links coupling one or more systems, engines or devices to the network 110.

In particular embodiments, each system or engine may be a unitary server or may be a distributed server spanning multiple computers or multiple datacenters. Systems, engines, or modules may be of various types, such as, for example and without limitation, web server, news server, mail server, message server, advertising server, file server, application server, exchange server, database server, or proxy server. In particular embodiments, each system, engine or module may include hardware, software, or embedded logic components or a combination of two or more such components for carrying out the appropriate functionalities implemented or supported by their respective servers. For example, a web server is generally capable of hosting websites containing web pages or particular elements of web pages. More specifically, a web server may host HTML files or other file types, or may dynamically create or constitute files upon a request, and communicate them to client devices or other devices in response to HTTP or other requests from client devices or other devices. A mail server is generally capable of providing electronic mail services to various client devices or other devices. A database server is generally capable of providing an interface for managing data stored in one or more data stores.

In particular embodiments, one or more data storages may be communicatively linked to one or more servers via one or more links. In particular embodiments, data storages may be used to store various types of information. In particular embodiments, the information stored in data storages may be organized according to specific data structures. In particular embodiment, each data storage may be a relational database. Particular embodiments may provide interfaces that enable servers or clients to manage, e.g., retrieve, modify, add, or delete, the information stored in data storage.

The system may also contain other subsystems and databases, which are not illustrated in FIG. 1, but would be readily apparent to a person of ordinary skill in the art. For example, the system may include databases for storing data, storing features, storing outcomes (training sets), and storing models. Other databases and systems may be added or subtracted, as would be readily understood by a person of ordinary skill in the art, without departing from the scope of the invention.

Figure 2:
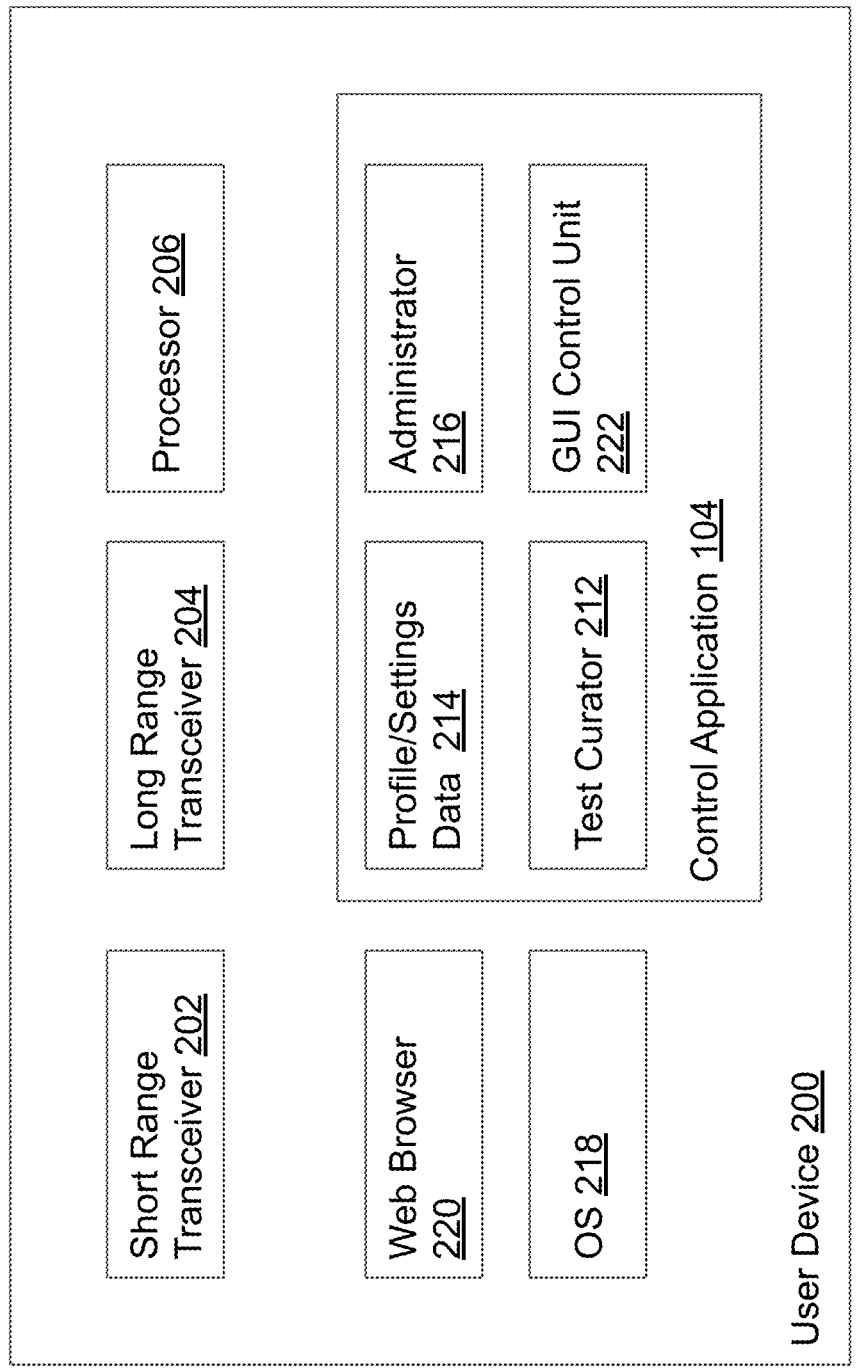
FIG. 2 illustrates modules associated with the GUI control application in accordance with an embodiment of the invention.

FIG. 2 illustrates an implementation of a user device 200 in accordance with an embodiment of the invention. The user device 200 may be or comprise the user device 101 in FIG. 1. The user device 200 may comprise a short range transceiver 202, a long range transceiver 204, a processor 206, and logic 210. The logic 210 may comprise a test curator 212, profile and/or setting data 214, an administrator 216, an operating system 218, a web browser 220, and an application 222. Other systems and databases may be used, as would be readily understood by a person of ordinary skill in the art, without departing from the scope of the invention.

The short range transceiver 202 may facilitate communication between the user device 101 in FIG. 1 and other devices at the premises 100 in FIG. 1, such as the control application 104 and/or the display device 106 (in embodiments where the control application 104 is embodied remotely from the user device 101). The short range transceiver 202 may facilitate communication over Wi-Fi, Bluetooth, Zigbee, etc.

The long range transceiver 204 may facilitate communication between the user device 101 in FIG. 1 and remote computing devices, such as the remote server 120 in FIG. 1. The long range transceiver 204 may facilitate communication over a cellular network, a Wi-Fi network, etc. The long range transceiver 204 may facilitate communication over the network 110 in FIG. 1.

The processor 206 may execute commands saved in storage. The logic 210 may comprise instructions and modules stored in memory. The processor 206 may execute the logic 210.

The test curator 212 may retrieve tests from remote computing devices, such as the remote server 120 in FIG. 1. The test curator 212 may retrieve information from remote computing devices, such as the remote server 120 in FIG. 1. In one embodiment, the test curator 212 may use retrieved information to create one or more tests. In another embodiment, the test may be created at the remote server 120. The remote server 120 may generate tests based on the grade level of the user and/or the user's demonstrated aptitude based on answers to previous questions. For example, if a user answered a threshold number of questions incorrectly, then the test may include a threshold number of previously presented questions. Similarly, if the user answered previously presented questions beyond a threshold amount of time limit, then the test may include a threshold number of previously presented questions. Conversely, if the user answered a threshold number of questions correctly and/or within a threshold period of time, then new questions at or above the currently measured aptitude level may be presented to the user.

The profile and/or setting data 214 may include information such as permission levels, and or data related to an access token data. In one embodiment, the profile data may include information about a user, such as the user's grade level, or competence level. It may also include permissions data, such as the amount of time the user may use the computing device. In one embodiment, the profile data may also contain granular data specifying the amount of time a user has to use one or more applications within a broader allotment of total time.

In one embodiment, the profile and/or setting data 214 may store points or currency accumulated by each user. Currency may be accumulated by, for example, answering questions, answering a threshold number of questions correctly, answering a threshold number of questions correctly within a threshold amount of time, etc. The amount of accumulated currency may be based on the difficulty level associated with the questions or a test (a test being a plurality of questions). The profile and/or setting data 214 may comprise conditions for enabling and/or disabling particular applications, such as the application 222, and/or devices, such as the display device 106 in FIG. 1, for particular users.

The administrator 216 may enable and/or disable access to applications, such as the application 222, and/or devices, such as the display device 106 in FIG. 1. The administrator 216 may enable and/or disable access to applications and/or devices based on information stored in the profile and/or setting data 214.

Figure 4A:
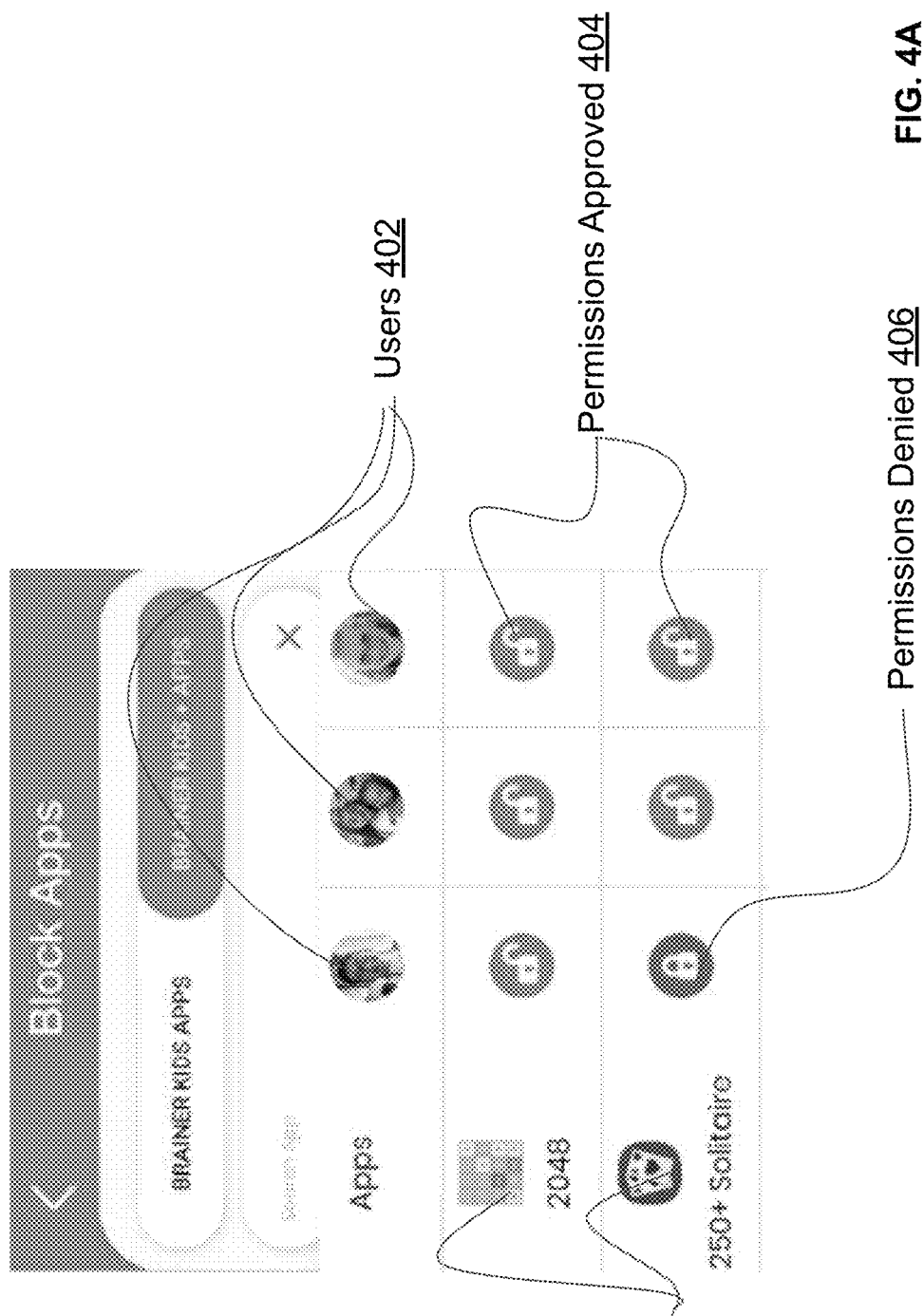
FIG. 4A illustrates an exemplary GUI interface in accordance with an embodiment of the invention.

These permissions may be set by a parent or an administrator. FIG. 4A illustrates an exemplary graphical user interface for receiving permissions based data. As illustrated in FIG. 4, a variety of users that an administrator or an parent may want to permission are illustrated in a first section of the GUI 402. The user may be illustrated by their name, for example, or by their photograph, or some other identifier, as would be apparent to a person of ordinary skill in the art. The applications that are installed on the user device, or may be available to download on the user device are illustrated in a second section as element 403. The permissions setting for each user and each application is illustrated in a third section of the graphical user interface as 404 and 406. In one embodiment, the permission approved 404 and permission denied 406 may be illustrated in the same section. However, the specific graphical user interface for the various permissions may be varied.

Figure 4B:
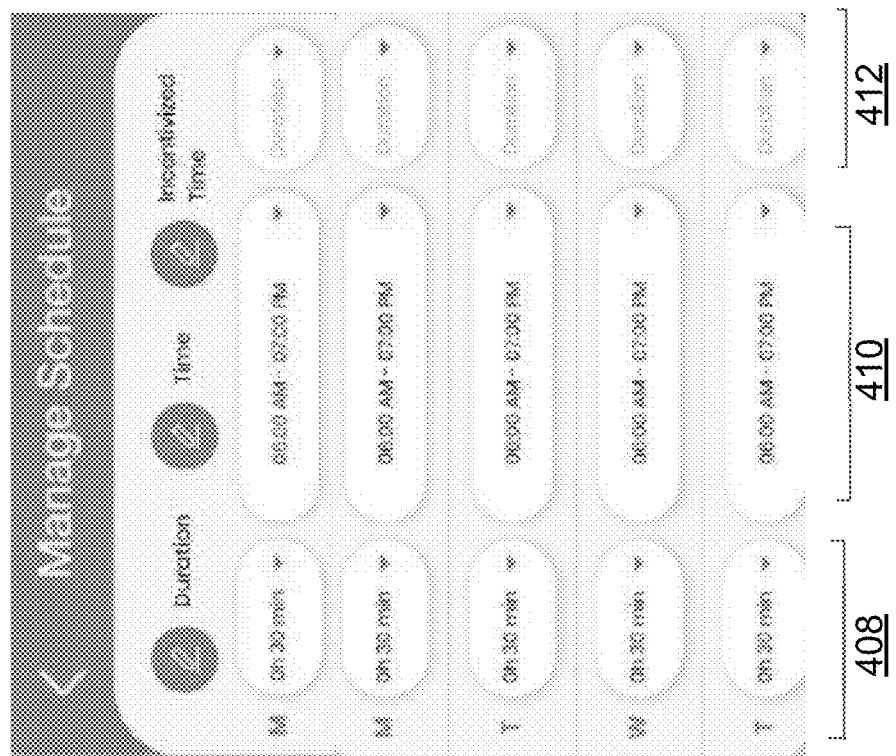
FIG. 4B illustrates an exemplary schedule management GUI interface in accordance with an embodiment of the invention.

FIG. 4B illustrates an exemplary graphical user interface for setting permissions. The first section of the graphical user interface 408 illustrates a total duration of application usage permitted for a portion of time, such as a day, or a week, etc. The second section 410 illustrates a start and/or stop time for permitted usage and/or unpermitted usage. The third section 412 illustrates incentivized time, which refers to additional time that a user can obtain via an access token if the user provides a threshold number of answers within a threshold amount of time.

The operating system 218 may be the same as the operating system described in FIG. 1 as element 102. It may control the hardware and the software of the user device 200. The operating system 218 may schedule tasks, execute applications, such as the application 222, and control peripherals, such as a microphone, speaker, etc. associated with the user device 200. The administrator 216 may cause the operating system 218 to stop and/or resume responding to requests to execute one or more applications, such as the application 222 or an application for controlling the display device 106 in FIG. 1.

The web browser 220 may allow the user device 101 in FIG. 1 to access a website hosted by a remote server, such as the remote server 120 in FIG. 1. The administrator 216 may cause the web browser 220 to stop and/or resume responding to requests for execution.

The GUI control application 222 may comprise any program executable on the user device 200. The GUI control application 222 may facilitate control of the display device 106 in FIG. 1. The administrator 216 may cause the application 222 to stop and/or resume responding to requests for execution.

Figure 3A:
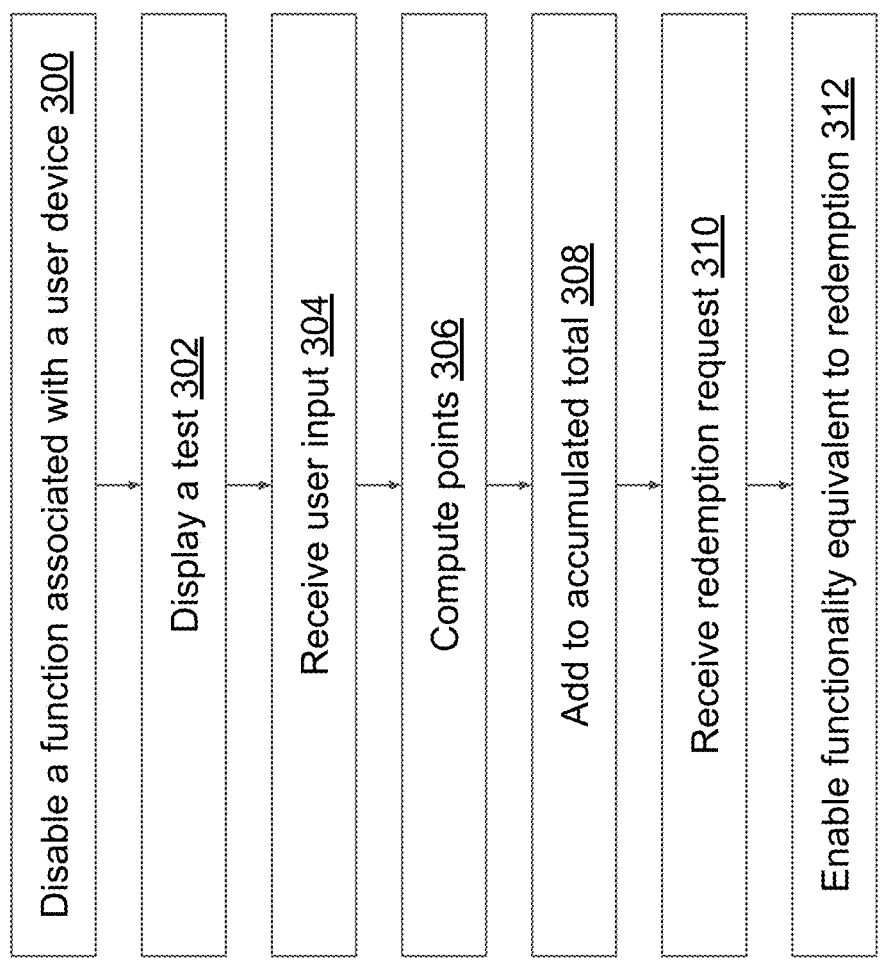
FIG. 3A illustrates a flowchart for task-based enabling of functionality in accordance with an exemplary embodiment of the present invention.

FIG. 3A illustrates a flowchart for task-based enablement of functionality in accordance with an exemplary embodiment of the present invention.

At 300, a function associated with a user device may be disabled. For example, the application 222 in FIG. 2 associated with the user device 200 in FIG. 2 may be disabled. As another example, a function for controlling the display device 106 in FIG. 1 associated with the user device 101 in FIG. 1 may be disabled. As another example, a function associated with the web browser 220 in FIG. 2 associated with the user device 200 in FIG. 2.

At 302, a test may be displayed. For example, the user device 101 in FIG. 1 may display a test. The test may be retrieved from one or more remote computing devices. The test may be created based on information retrieved from one or more remote computing devices.

At 304, answers for the test may be received. For example, the user device 101 in FIG. 1 may receive answers for the test from a user.

At 306, an amount of digital currency may be determined based on the received answers. For example, the user device 101 in FIG. 1 may determine an amount of digital currency based on the received answers. The amount of digital currency determined may be based on a number of correct answers. The amount of digital currency determined may be based on a difficulty associated with the received answers. The amount of digital currency determined may be based on a difficulty associated with correct answers. The amount of digital currency determined may be based on a subject associated with the received answers. The amount of digital currency determined may be based on a subject associated with correct answers. The digital currency may comprise virtual currency, virtual points, cryptocurrency, digital tokens, etc.

At 308, the determined amount may be added to a digital currency total. For example, the user device 101 in FIG. 1 may add the determined amount to a digital currency total. The digital currency total may comprise a sum of digit currency determined from previous tests and the displayed test for a user, subtracted by a sum of digit currency redeemed by the user.

At 310, a redemption request may be received via a user input. The request may be to enable a certain application or a plurality of applications for a period of time.

If the user is in fact enabled to redeem the functionality, then the process at 312 may enable a function in response to redemption of at least a portion of the digital currency total. For example, an application in a first list be enabled in response to redemption of at least a portion of the digital currency total. As another example, a function for controlling the display device 106 in FIG. 1 may be enabled in response to redemption of at least a portion of the digital currency total. As another example, a function associated with the web browser 220 in FIG. 2 may be enabled in response to redemption of at least a portion of the digital currency total. The function may be enabled for a time period based on the amount in the portion of the digital currency total. The function may be disabled after the time period. The digital currency total may be reduced by the portion of the digital currency total redeemed resulting in a new digital currency total.

Figure 3B:
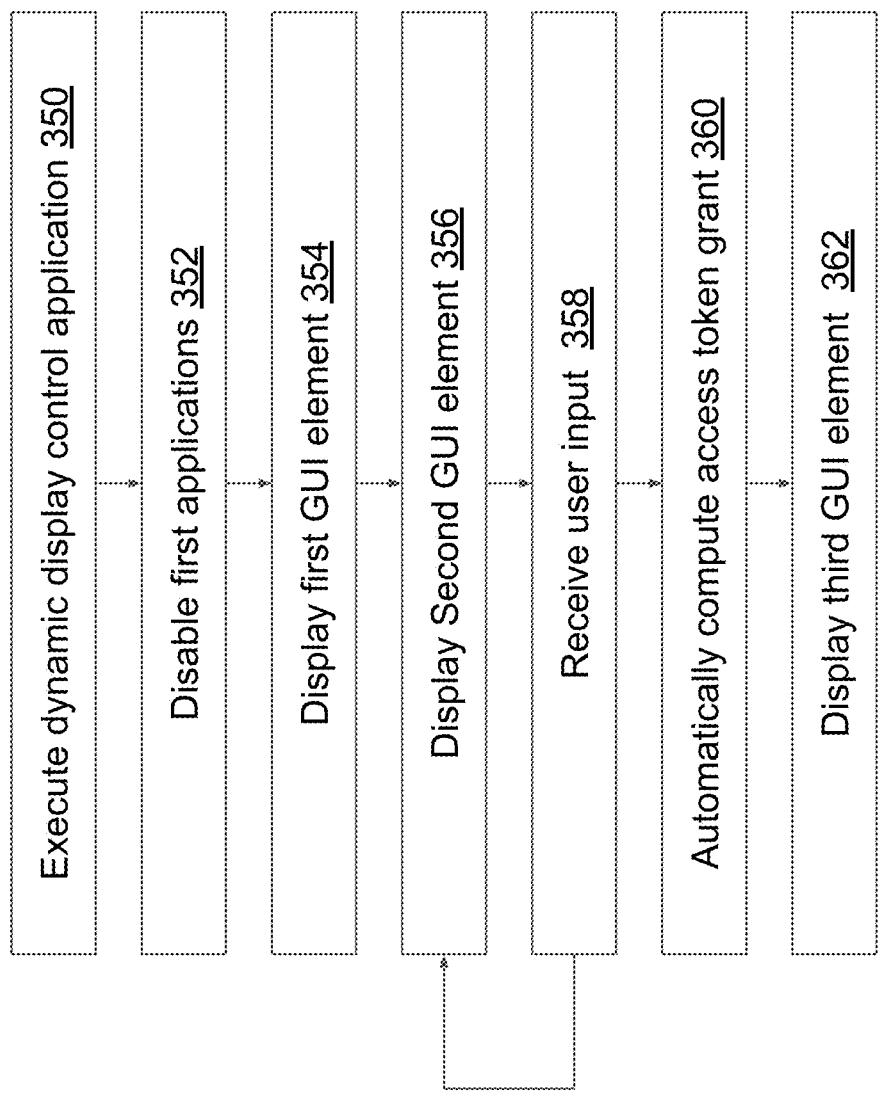
FIG. 3B illustrates a flowchart for GUI control in accordance with an exemplary embodiment of the present invention.

FIG. 3B illustrates the graphical user interface modification that is enabled by the present invention. In one embodiment, a dynamic display control application is executed 350. The dynamic display control application is also illustrated as a control application 104 in FIG. 1, and GUI control unit 222 in FIG. 2. When the application is executed, it interfaces with the operating system of a user device and disables 352 applications on a client device. In one embodiment, the disabled applications may be provided in a first list, such as the one illustrated in FIG. 4A. In other embodiments, the disabled applications may be unlisted in a first list, or, in yet another embodiment, may be designated as un-permissioned (or permission rejected) in another graphical user interface, such as the one illustrated in FIG. 4A.

The process continues by displaying a first graphical user interface 354 illustrating the applications that are disabled. The first graphical user interface may be a notification or a pop-up, or a page or screen. The first graphical user interface may be displayed by executing a first set of executable instructions.

Figure 4C:
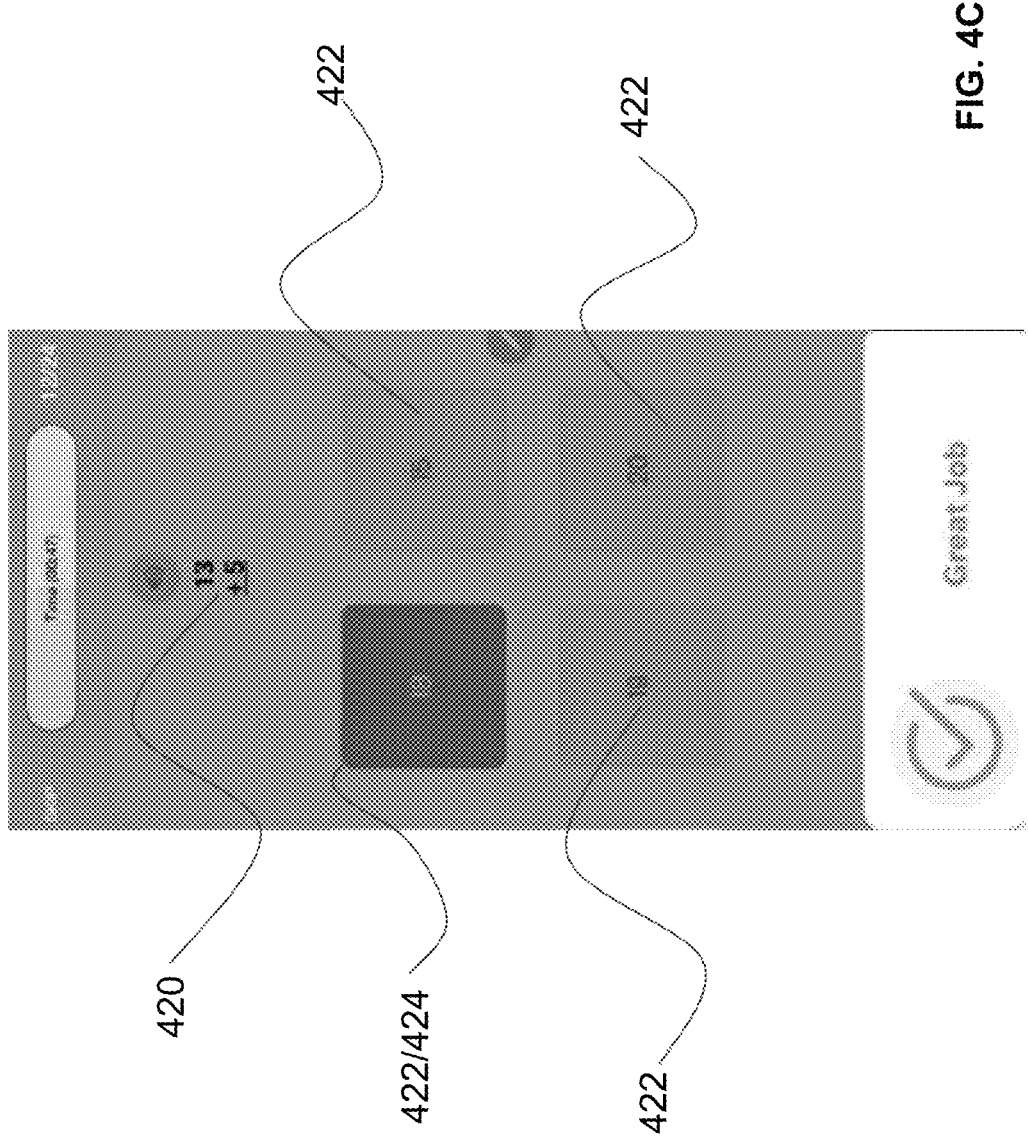
FIG. 4C illustrates an exemplary GUI interface for user input in accordance with an embodiment of the invention.

Thereafter, a second graphical user interface is displayed 356. The second graphical user interface may be comprised of three sections, wherein a first section displays queries, a second section displays a plurality of possible responses, and a third section for receiving user input. An exemplary second graphical user interface is illustrated in FIG. 4C. It illustrates a first section 420 of one or more queries. A second section 422, which illustrates a plurality of possible responses. And a third section 424, which illustrates a received user input. In one embodiment, as illustrated in FIG. 4C, the second and third sections may be the same. In other words, a graphical user interface illustrating possible responses may each also receive a user selection via a user input. The selected answer is then analyzed for correctness via the control application or via a remote server. The second graphical user interface may be displayed by executing a second set of executable instructions.

Once a user input is received 358, additional questions may be presented to the user via the second graphical user interface 356.

The process may automatically compute an access token grant 360 based on questions as they are received in real time or until a plurality of questions are answered. The computation may be performed by the control application executing on a client device, or may be computed at a server. The computation may be based on whether the user has answered the question presented correctly and/or whether an answer or a plurality of answers are received within a threshold amount of time. A further computation may be performed to convert the user score into an access token grant. A variety of different applications may be enabled for a varying amount of time based on a redemption of the access token grant.

Thereafter, the process displays a third GUI element by executing a third set of executable instructions, the third GUI elements displaying applications in the first list that are no longer disbaled based on the number of access tokens that are available to the user. In other words, the third GUI element may illustrate applications that can be enabled by the user based on the access token grants that are available to the user.

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 5:
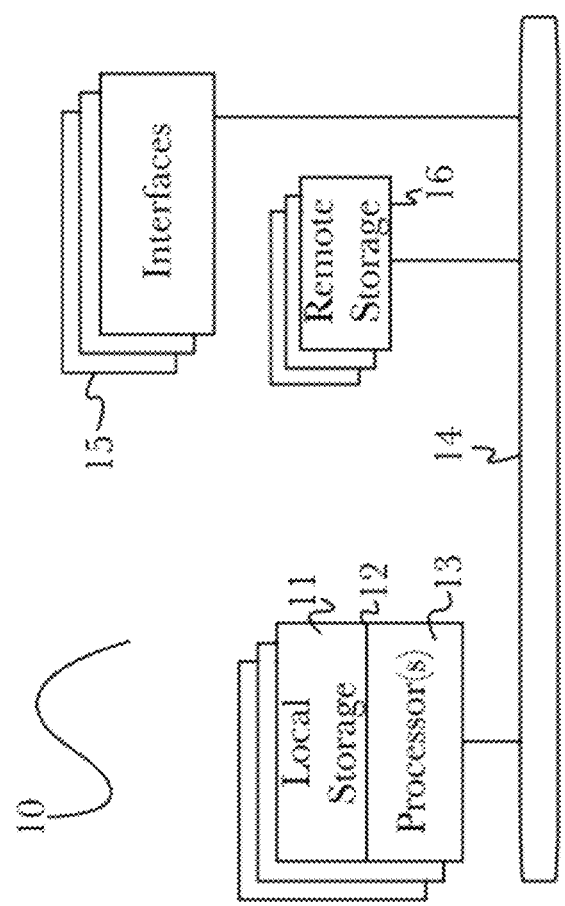
FIG. 5 illustrates an exemplary computing device that supports an embodiment of the inventive disclosure.

Referring now to FIG. 5, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 5 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

The computing device 10 may be and/or comprise the user device 101 in FIG. 1.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 6:
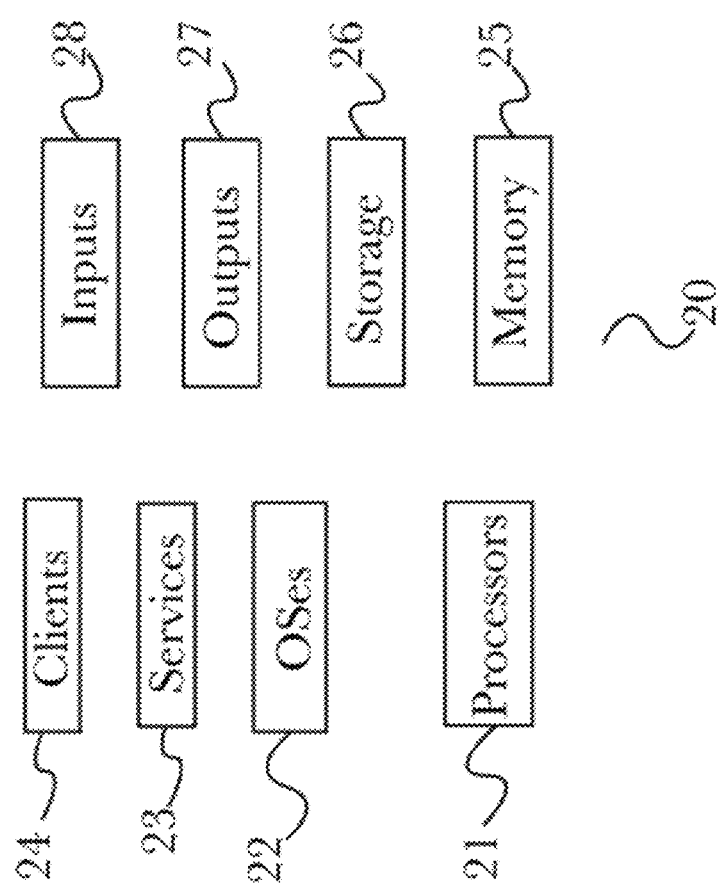
FIG. 6 illustrates an exemplary standalone computing system that supports an embodiment of the inventive disclosure.
Figure 7:
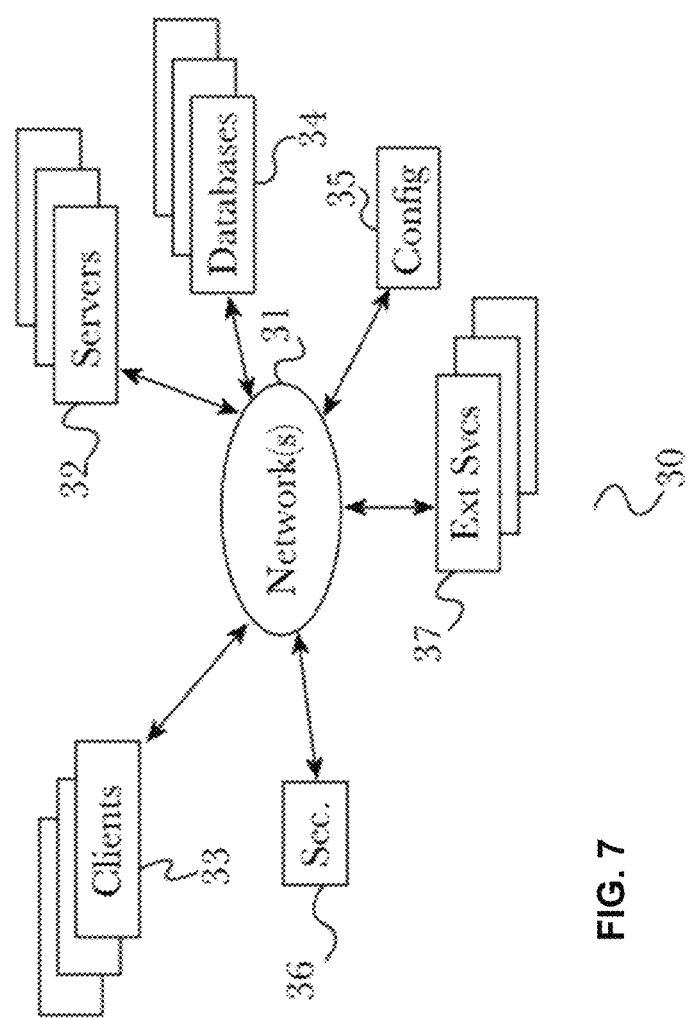
FIG. 7 illustrates on embodiment of the computing architecture that supports an embodiment of the inventive disclosure.

In some embodiments, systems may be implemented on a standalone computing system. Referring now to FIG. 6 above, there is shown a block diagram depicting a typical exemplary architecture of one or more embodiments or components thereof on a standalone computing system. Computing device 20 includes processors 21 that may run software that carry out one or more functions or applications of embodiments, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 5). Examples of storage devices 26 include flash memory, magnetic hard drive, CD-ROM, and/or the like.

The system 20 may be and/or comprise the user device 101 in FIG. 1.

In some embodiments, systems may be implemented on a distributed computing network, such as one having any number of clients and/or servers. Referring now to FIG. 6, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 5. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific aspect.

The one or more of the server(s) 32 may be and/or comprise the user device 101 in FIG. 1.

Figure 8:
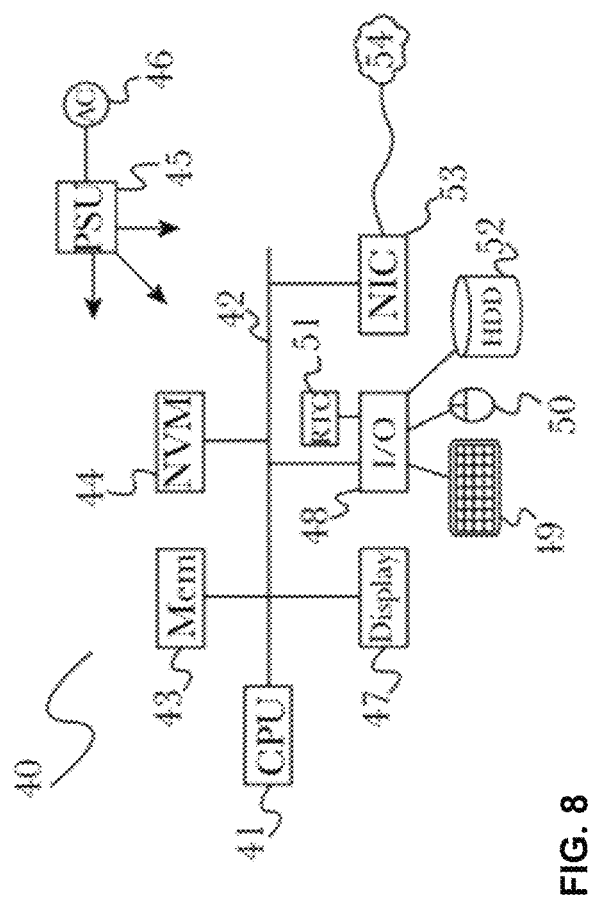
FIG. 8 illustrates an exemplary overview of a computer system that supports an embodiment of the inventive disclosure.

FIG. 8 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

The computer system 40 may be and/or comprise the user device 101 in FIG. 1.

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for task-based enabling of functionality through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A computer-implemented method for dynamically displaying applications on a mobile computer to display applications that are approved for use based on activity data, the computer-implemented method comprising:
   executing a dynamic display control application on a client device, the dynamic display control application comprising first executable instructions, second executable instructions, and third executable instructions;
   disabling applications in a first list that are executable by the first computing device by executing the first executable instructions;
   displaying a first graphical user interface (GUI) element illustrating that applications in a first list are disabled;
   displaying a second GUI element by executing the second executable instructions, the second GUI element comprising a first section displaying queries, second section displaying a plurality of responses, and a third section for receiving user input;
   receiving user input;
   automatically determining whether the user has provided a threshold number of suitable responses via user input within a threshold amount of time, the determining based on communication with a server system, the server system providing suitable responses for each query and the threshold amount of time;
   automatically computing access token grant, the access token grant computed based on the number of suitable responses that are received within a threshold period of time, a threshold number of access tokens enabling access to at least one application in the first list; and
   displaying a third GUI element by executing the third executable instructions, the third GUI element displaying applications in the first list that are no longer disabled based on the number of access tokens that are available to the user.

2. The computer-implemented method of claim 1, wherein the first executable instructions execute a first policy file, wherein the first policy file is provided by a server system.

3. The computer-implemented method of claim 1, wherein executing the first executable instructions disables the application switching capability, and further comprises disabling a file explorer or a task manager associated with the operating system of the client device.

4. The computer-implemented method of claim 1, further comprising sending user input data to the server system.

5. The computer-implemented method of claim 1, wherein the access token grant is additionally computed based on parameters provided by the server system, the parameters being configurable by a second client device in communication with the server system.

6. The computer-implemented method of claim 5, wherein the access token grant is additionally computed based on a plurality of previous access token grants.

7. The computer-implemented method of claim 1, wherein executing the third executable instructions enables the application switching capability, and further enables a file explorer or a task manager associated with the operating system of the client device.

8. The computer-implemented method of claim 7, wherein the application switching capability is enabled based on access grants.

9. A non-transitory computer-readable medium embodying a program for dynamically displaying applications on a client device to display applications that are approved for use based on activity data, the program, when executed by a client device, causes the client device to at least:
   disable applications in a first list that are executable by the client device by executing the first executable instructions;
   display a first graphical user interface (GUI) element illustrating that applications in a first list are disabled;
   display a second GUI element by executing the second executable instructions, the second GUI element comprising a first section displaying queries, second section displaying a plurality of responses, and a third section for receiving user input;

receive user input;

automatically determine whether the user has provided a threshold number of suitable responses via user input within a threshold amount of time, the determining based on communication with a server system, the server system providing suitable responses for each query and the threshold amount of time;

automatically compute an access token grant, the access token grant computed based on the number of suitable responses that are received within a threshold period of time, a threshold number of access tokens enabling access to at least one application in the first list; and display a third GUI element by executing the third executable instructions, the third GUI element displaying applications in the first list that are no longer disabled based on the number of access tokens that are available to the user.

10. A non-transitory computer-readable medium embodying a program of claim 9, further causing the client device to disable application switching capability, and disable a file explorer or a task manager associated with the operating system of the client device.

11. A non-transitory computer-readable medium embodying a program of claim 9, further causing the client device to send user input data to the server system.

12. A non-transitory computer-readable medium embodying a program of claim 9, wherein the access token grant is additionally computed based on parameters provided by the server system, the parameters being configurable by a second client device in communication with the server system.

13. A non-transitory computer-readable medium embodying a program of claim 12, wherein the access token grant is additionally computed based on a plurality of previous access token grants.

14. A non-transitory computer-readable medium embodying a program of claim 9, wherein executing the third executable instructions enables the application switching capability, and further enables a file explorer or a task manager associated with the operating system of the client device.

15. A non-transitory computer-readable medium embodying a program of claim 14, wherein the application switching capability is enabled based on access grants.

16. A system for dynamically displaying applications on a client device to display applications that are approved for use based on activity data, the system comprising:

a client device executing a client application; and a computing environment executing a management service, the computing environment in communication with the client device over a network, wherein the client device is configured to:

execute a dynamic display control application, the dynamic display control application comprising first executable instructions, second executable instructions, and third executable instructions;

disable applications in a first list that are executable by the first computing device by executing the first executable instructions;

display a first graphical user interface (GUI) element illustrating that applications in a first list are disabled;

display a second GUI element by executing the second executable instructions, the second GUI element comprising a first section displaying queries, second section displaying a plurality of responses, and a third section for receiving user input;

receive user input;

automatically determine whether the user has provided a threshold number of suitable responses via user input within a threshold amount of time, the determining based on communication with a server system, the server system providing suitable responses for each query and the threshold amount of time;

automatically compute access token grant, the access token grant computed based on the number of suitable responses that are received within a threshold period of time, a threshold number of access tokens enabling access to at least one application in the first list; and display a third GUI element by executing the third executable instructions, the third GUI element displaying applications in the first list that are no longer disabled based on the number of access tokens that are available to the user.

17. The system of claim 16, wherein the first executable instructions execute a first policy file, wherein the first policy file is provided by a server system.

18. The system of claim 16, wherein executing the first executable instructions disables the application switching capability, and further comprises disabling a file explorer or a task manager associated with the operating system of the client device.

19. The system of claim 16, further comprising sending user input data to the server system.

20. The system of claim 16, wherein the access token grant is additionally computed based on parameters provided by the server system, the parameters being configurable by a second client device in communication with the server system.

* * * * *